(12) United States Patent
Lee et al.

(10) Patent No.: US 8,461,715 B2
(45) Date of Patent: Jun. 11, 2013

(54) APPARATUS FOR WIND COLLECTION

(75) Inventors: Francis Chee-Shuen Lee, Hong Kong (HK); Ho Yin Chan, Hong Kong (HK)

(73) Assignee: Hong Kong Applied Science and Technology Research Institute Company Limited, Hong Kong Science Park Shatin, New Territories, Hong Kong (CN)

( * ) Notice: Subject to any disclaimer, the term of this patent is extended or adjusted under 35 U.S.C. 154(b) by 437 days.

(21) Appl. No.: 12/901,529

(22) Filed: Oct. 10, 2010

(65) Prior Publication Data
US 2012/0086212 A1 Apr. 12, 2012

(51) Int. Cl.
*H02P 9/04* (2006.01)
*F03D 7/00* (2006.01)

(52) U.S. Cl.
USPC .................. 290/55; 290/54; 415/4.2; 454/38

(58) Field of Classification Search
USPC ............................ 290/54, 55; 415/4.2; 454/38
See application file for complete search history.

(56) References Cited

U.S. PATENT DOCUMENTS

| | | | | |
|---|---|---|---|---|
| 3,347,147 A * | 10/1967 | Howard | | 454/38 |
| 3,382,792 A * | 5/1968 | Howard | | 454/38 |
| 4,421,452 A | 12/1983 | Rougemont | | 415/4.2 |
| 4,508,973 A | 4/1985 | Payne | | 290/55 |
| 4,603,619 A * | 8/1986 | Amphoux | | 454/33 |
| 4,963,761 A * | 10/1990 | Wight | | 290/55 |
| 5,326,313 A * | 7/1994 | Miniat | | 454/18 |
| 6,302,778 B1 * | 10/2001 | Andrews et al. | | 454/16 |
| 6,518,680 B2 * | 2/2003 | McDavid, Jr. | | 290/54 |
| 6,582,291 B2 * | 6/2003 | Clark | | 454/19 |
| 6,590,300 B1 * | 7/2003 | Preito Santiago | | 290/55 |
| 6,710,469 B2 * | 3/2004 | McDavid, Jr. | | 290/55 |
| 6,800,955 B2 * | 10/2004 | McDavid, Jr. | | 290/54 |
| 6,841,894 B2 * | 1/2005 | Gomez Gomar | | 290/55 |
| 7,025,671 B2 * | 4/2006 | Lin | | 454/39 |
| 7,211,905 B1 * | 5/2007 | McDavid, Jr. | | 180/65.31 |
| 7,320,636 B2 * | 1/2008 | Seliger et al. | | 454/63 |
| 7,400,057 B2 * | 7/2008 | Sureshan | | 290/55 |
| 7,488,150 B2 * | 2/2009 | Krippene | | 415/4.2 |
| 7,611,325 B2 | 11/2009 | Caldwell | | 415/4.1 |
| 7,682,231 B2 * | 3/2010 | Enzenroth et al. | | 454/16 |
| 7,753,644 B2 * | 7/2010 | Krippene | | 415/4.2 |
| 7,834,477 B2 * | 11/2010 | Sheikhrezai | | 290/55 |
| 7,866,938 B2 * | 1/2011 | Kariya | | 415/4.4 |
| 7,931,434 B2 * | 4/2011 | Raynal | | 415/2.1 |
| 8,128,337 B2 * | 3/2012 | Pezaris | | 415/4.2 |
| RE43,653 E * | 9/2012 | Lin | | 454/39 |

(Continued)

*Primary Examiner* — Pedro J Cuevas
(74) *Attorney, Agent, or Firm* — Ella Cheong Hong Kong; Margaret A. Burke; Sam T. Yip

(57) ABSTRACT

The present invention provides an omnidirectional wind collection apparatus. The wind collector includes an outer housing with a peripheral wind inlet circumferentially formed therein. An inner housing disposed within the outer housing has an inner surface with a first opening at a lower end thereof to guide the collected wind to a smaller second opening at the top end. The inner surface is curved between the bottom and top openings to form a progressively narrower passage. The configuration of the inner surface creates a Venturi effect such that the wind is accelerated toward the second opening. A wind pass-through portion is formed above the second opening in the inner housing. Based on the Bernoulli effect, the passage of uncollected wind through this portion creates a low pressure region that expedites flow of collected wind through the first and second openings of the inner housing.

20 Claims, 3 Drawing Sheets

U.S. PATENT DOCUMENTS

| | | | |
|---|---|---|---|
| 8,298,053 B2* | 10/2012 | Parry | 454/38 |
| 8,314,508 B2* | 11/2012 | Kawas et al. | 290/55 |
| 2002/0180216 A1* | 12/2002 | McDavid, Jr. | 290/55 |
| 2003/0025334 A1* | 2/2003 | McDavid, Jr. | 290/54 |
| 2003/0111844 A1* | 6/2003 | McDavid, Jr. | 290/55 |
| 2003/0156938 A1 | 8/2003 | Verini | 415/4.2 |
| 2007/0231118 A1* | 10/2007 | Krippene | 415/4.2 |
| 2009/0155043 A1* | 6/2009 | Krippene | 415/4.2 |
| 2009/0315332 A1 | 12/2009 | Sheikhrezai | 290/55 |
| 2010/0084867 A1* | 4/2010 | Sato | 290/52 |
| 2010/0278629 A1* | 11/2010 | Krippene | 415/1 |
| 2011/0033288 A1* | 2/2011 | Pezaris | 415/208.1 |
| 2012/0121396 A1* | 5/2012 | Krippene | 415/182.1 |
| 2012/0223528 A1* | 9/2012 | Mena Vergara | 290/55 |
| 2012/0288357 A1* | 11/2012 | Krippene | 415/1 |
| 2012/0301282 A1* | 11/2012 | Kim | 415/182.1 |

* cited by examiner

APPARATUS FOR WIND COLLECTION

FIELD OF THE INVENTION

The present invention relates to an apparatus for wind collection and, more particularly, an apparatus for collecting wind to be used for power generation.

BACKGROUND

Wind energy is being increasingly considered as a "green" energy solution, particularly for the generation of electricity. "Wind farms" have been developed on large parcels of land or in offshore regions. These wind farms typically use generators that include large turbine blades that rotate in vertical plane. The blades are generally positioned facing the prevailing wind direction for optimal energy production. However, these large turbines require a great deal of space and are noisy, making them unsuitable for use in densely populated areas such as urban environments.

In urban environments, wind direction is less predictable because numerous high-rise buildings and other large structures divert the wind, accelerate the wind (as in narrow spaces between closely-spaced high rise buildings), and/or create turbulent wind patterns. However, in many cities there is a considerable amount of wind which, if properly harvested, could produce a substantial percentage of the population's energy needs. One approach is set forth in U.S. Patent Application Publication 2009/0315332 A1 which describes a wind speed accelerator and wind catcher which can be mounted on a rooftop in an urban setting. Rotating blades are confined within a housing to prevent exposure to wildlife. Wind flows from top to bottom, exiting through a cone-shaped structure with the top of the cone being larger than the bottom of the cone. Air can enter the wind catcher from all sides. Although the '332 system can be used in urban environments, there remains a need in the art for improved wind harvesting devices that efficiently collect wind from plural directions.

SUMMARY OF THE INVENTION

The present invention provides an improved omnidirectional wind collection apparatus which efficiently collects and accelerates wind; in an exemplary embodiment, the collected wind drives an electric power generator. The wind collection apparatus can be made in a size for mounting on the rooftops of urban building or on other urban structures and provides quiet operation. The wind collector includes an outer housing with a peripheral wind inlet circumferentially formed therein in order to omnidirectionally collect wind. An inner housing is disposed within the outer housing. The inner housing has an inner surface having a first opening at a lower end thereof to guide the wind collected from the first peripheral wind inlet. The inner surface is curved from the first opening to form a progressively narrower passage as it extends upward. The surface ends at a smaller second opening at the upper end through which the collected wind passes. The configuration of the inner surface creates a Venturi effect such that the wind is accelerated toward the second opening.

A wind pass-through portion is formed above the second opening in the inner housing. The wind pass-through portion has plural circumferential openings configured to omnidirectionally facilitate passage of uncollected wind therethrough. Based on the Bernoulli effect, the passage of the uncollected wind creates a low pressure region in the wind pass-through portion that expedites flow of collected wind through the first and second openings of the inner housing inner surface.

DETAILED DESCRIPTION

Figure 1:
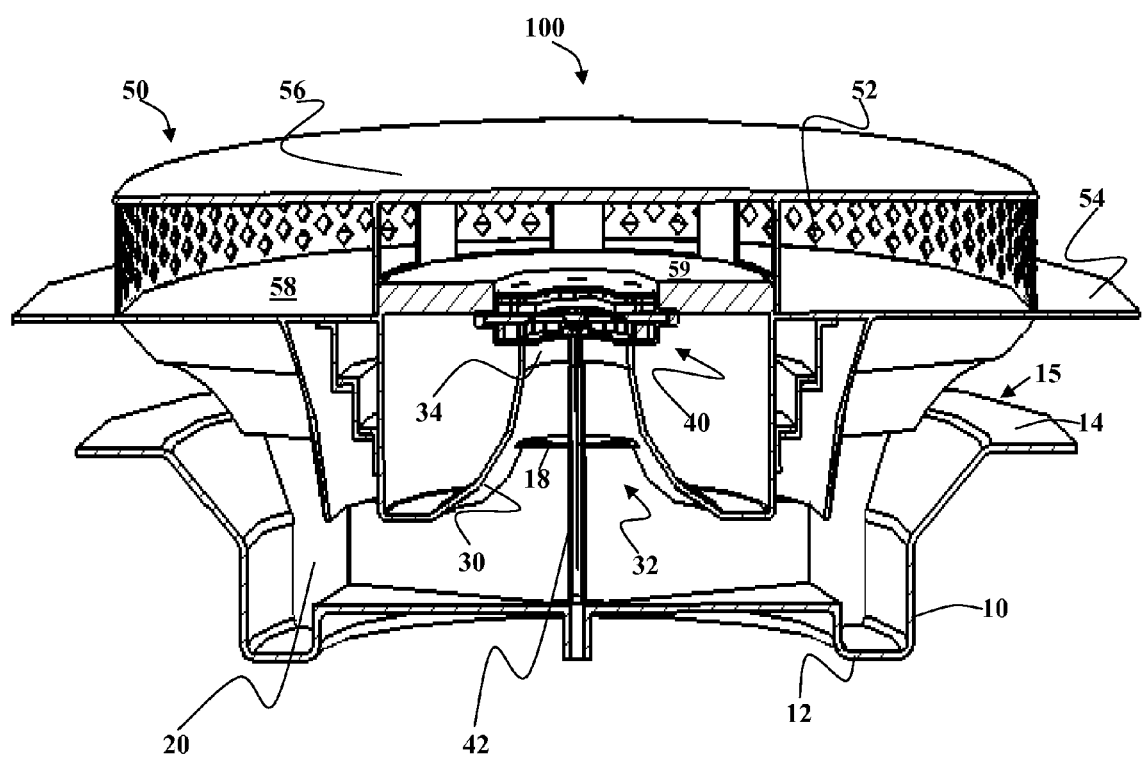
FIG. 1 depicts a cross-sectional view of a wind collection apparatus according to the present invention.

Turning to the drawings in detail, FIG. 1 depicts a cross-sectional view of a wind collection apparatus according to an embodiment of the present invention. Wind collection apparatus 100 includes an external housing partially circumferentially surrounding an inner housing 20 such that a first wind inlet opening 15 is formed. The inner housing has an inner surface 30 circumferentially formed therein. The inner surface has a large first opening 32 at the bottom and a smaller second opening 34 at the top. Inner surface curves between first opening 32 and second opening 34 and is optionally configured as a Venturi tube in order to accelerate airflow between the first and second openings. The relative arrangement of the outer housing and the inner housing directs the collected wind downward and then upward such that particulate matter in the wind is collected in channel 12 formed between the housings. This 180° turn of air flow helps separate any large debris/particles by centripetal force since relatively large debris/particles are too heavy to follow this air flow path change. The surface of channel 12 can be made sticky, if necessary, in order to collect larger particles. Smaller particles are captured by optional filter 18 positioned between the first and second openings in the inner housing. Channel 12 can optionally include drainage holes for any water that inadvertently enters the wind collector. Channel 12, when configured with a level base, as shown, can support the wind collector 100 when positioned on a support surface such as a roof. Alternatively, wind collector 100 may be positioned on a tower, such as a cell-phone tower or a solar collection tower.

It is noted that while the drawings depict wind collection apparatus as having a substantially circular cross-sectional shape, it is understood that other cross-sectional shapes such as squares, rectangles, and other polygons can also be used for the wind collection apparatus of the present invention.

When used to generate electricity, wind collector includes electric power generator 40 positioned adjacent second opening 34. Electric power generator includes blades driven by the collected wind which rotate in a horizontal plane. An exemplary power generator for use with the wind collection apparatus 100 is disclosed in co-pending, commonly-assigned U.S. patent application Ser. No. 12/901,530, the disclosure of which is incorporated by reference herein. However, any electric generator with suitably positioned blades to use the collected wind may be used as electric generator 40 with wind collector 100. Current from generator 40 is collected and directed along power cable 42 towards a destination usage point.

Positioned above inner housing 20 is omnidirectional wind flow-through portion 50; wind can enter and exit the flow-through portion 50 via plural openings 52. Openings 52 may be configured in a variety of know ways, for example, by a screen, mesh, or other porous material which permits free flow of wind therethrough. As wind passes through portion 50, the speed of the wind in this section creates a low-pressure region relative to the inner housing 20 via the Bernoulli effect. In a principle similar to lift on an airfoil, the air flowing faster in portion 50 creates a pressure differential between portion 50 and inner housing 20 which tends to draw the collected wind from the second opening 34, increasing the speed of the collected wind through the electric generator 40. The wind flow-through portion 50 is protected by a roof 56 which also advantageously covers electric generator 40. Portion 50 is separated from the inner housing 20 by a base 58 which includes mounting section 59 for securing electric generator 40.

Figure 2A:
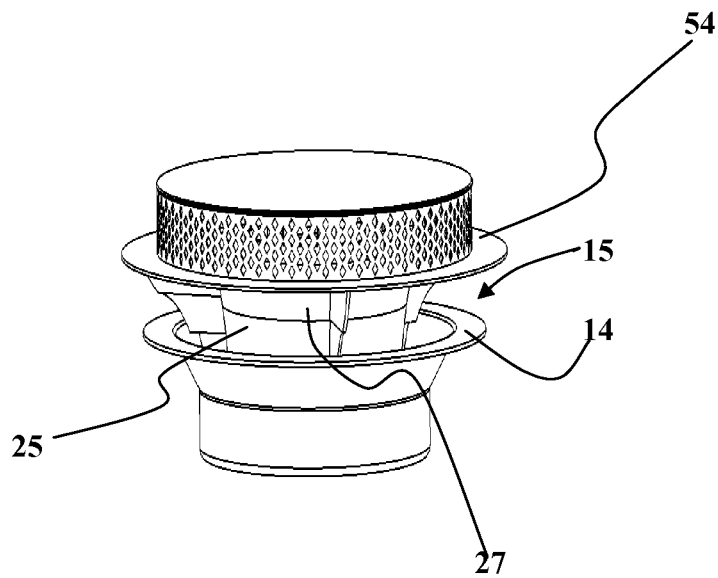
FIGS. 2A-2C are perspective views of the wind collection apparatus configured for different wind speed conditions.
Figure 2B:
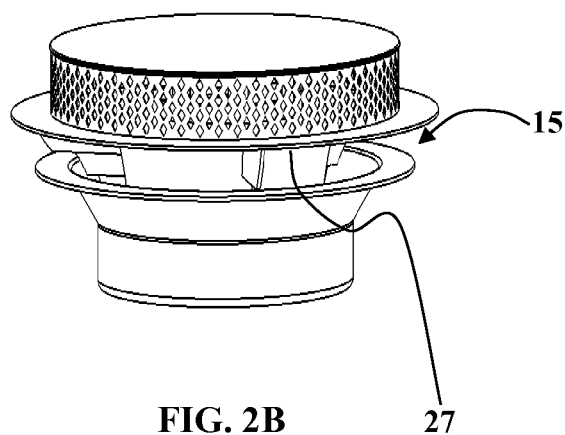
Figure 2C:
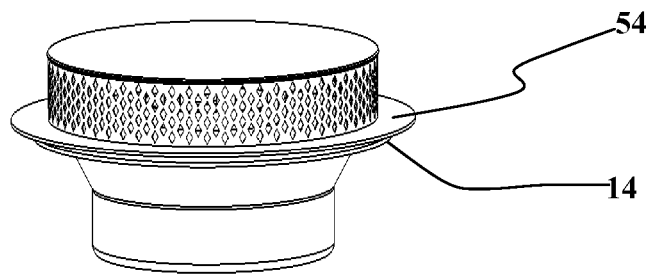

Optionally, wind collection portion 50 includes a flange 54 extending from base 58 that protects wind inlet 15 from interference from debris and precipitation. Flange 54 may be configured to mate with optional wind inlet flange 14 formed in external housing 10 for optional closing of wind collector 100 during adverse weather conditions as seen in FIGS. 2A-2C. As seen in FIGS. 2A-2C, inner housing 20 includes collapsible sections 25 and 27 that are telescopically configured to concentrically fit over one another to open and close wind inlet 15. In low speed wind conditions, sections 25 and 27 are fully extended to create a large wind inlet 15 (FIG. 2A). In moderate wind conditions, section 27 concentrically surrounds section 25 to create a more narrow wind inlet 15, as seen in FIG. 2B. Finally, during adverse weather, including high speed wind conditions, both sections 27 and 25 are engaged within external housing 10 and flanges 54 and 14 mate with each other, closing the wind inlet. In an optional embodiment, a wind speed detector (not shown) is provided to measure wind conditions. At a preset wind speed, the wind speed detector trips a switch for automatic closure of wind collector 100 via mechanical actuators (not shown).

Figure 3A:
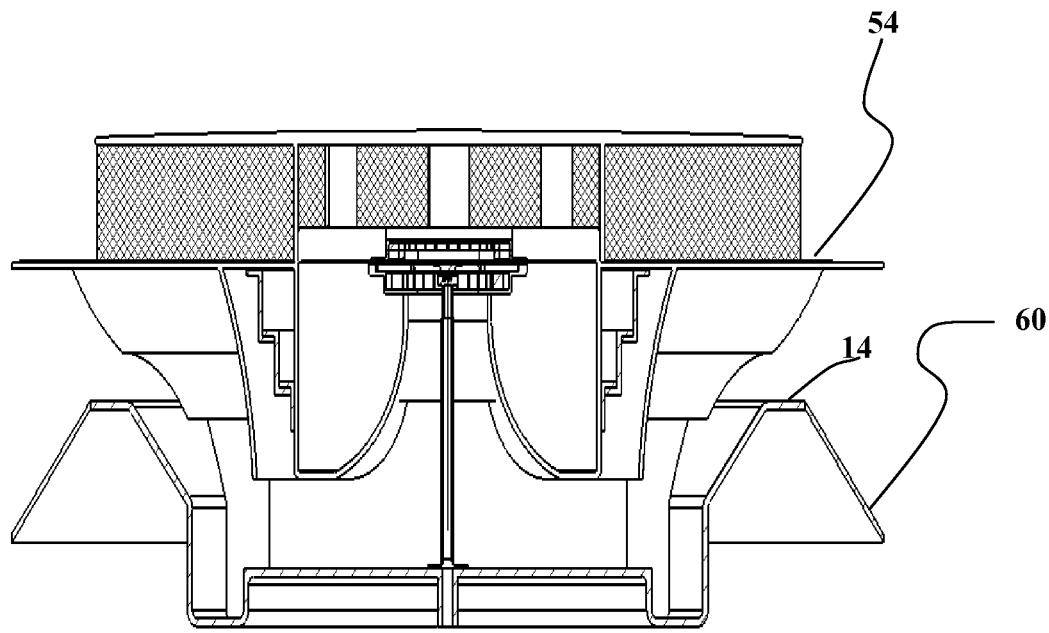
FIGS. 3A and 3B show cross-sectional views of a wind collection apparatus with adjustable flaps for opening and closing a wind inlet.
Figure 3B:
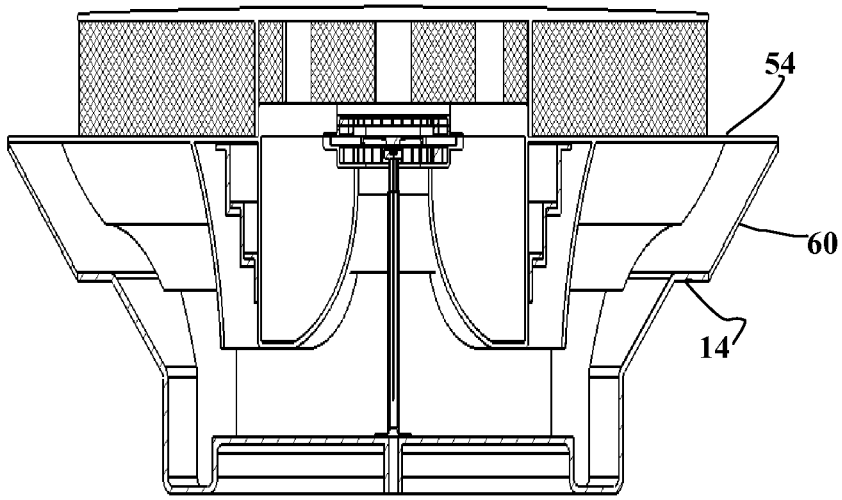

Alternatively, as seen in FIGS. 3A and 3B adjustable flaps 60 rotatably communicating with outer housing flange 14 may be used to open and close wind inlet 15. In the closed position of FIG. 3B, the flaps 60 seat against the edge of flange 54 to close the wind inlet 15.

While the foregoing invention has been described with respect to various embodiments, such embodiments are not limiting. Numerous variations and modifications would be understood by those of ordinary skill in the art. Such variations and modifications are considered to be included within the scope of the following claims.

What is claimed is:

1. An omnidirectional wind collection apparatus comprising:
   an outer housing;
   a first peripheral wind inlet circumferentially formed in the outer housing to omnidirectionally collect wind;
   an inner housing disposed within the outer housing, the inner housing having an inner surface having a first opening at a lower end thereof to guide the wind collected from the first peripheral wind inlet, the inner surface being curved from the first opening to form a progressively narrower passage and having a second opening through which the collected wind passes at an upper end thereof, the second opening being smaller than the first opening;
   a wind pass-through portion formed above the second opening in the inner housing, the wind pass-through portion having a plurality of circumferential openings configured to omnidirectionally facilitate passage of uncollected wind therethrough, the passage of the uncollected wind creating a low pressure region in the wind pass-through portion to expedite flow of collected wind through the first and second openings of the inner housing inner surface.

2. An omnidirectional wind collection apparatus according to claim 1, further comprising an electric generator having rotatable blades configured to rotate in a horizontal plane positioned adjacent the second opening and beneath the wind pass-through portion such that the collected wind rotates the rotatable blade.

3. An omnidirectional wind collection apparatus according to claim 1 wherein the outer housing is adjustable relative to the inner housing such that the first peripheral wind inlet can be open or closed depending upon the position of the outer housing.

4. An omnidirectional wind collection apparatus according to claim 1 wherein the wind pass-through portion includes an external flange and the outer housing includes a mating flange adjacent the first peripheral wind inlet such that the external flange and the mating flange contact each other when the first peripheral wind inlet is closed.

5. An omnidirectional wind collection apparatus according to claim 1 further comprising a filter positioned between the first and second openings of the inner housing inner surface.

6. An omnidirectional wind collection apparatus according to claim 1 further comprising a channel between the inner and outer housing for collection of particulate matters.

7. An omnidirectional wind collection apparatus according to claim 1 wherein the outer housing and the inner housing each have a substantially circular cross-section.

8. An omnidirectional wind collection apparatus according to claim 1 further comprising movable flaps circumferentially connected to the outer housing and configured to open and close the first peripheral wind inlet.

9. An omnidirectional wind collection apparatus according to claim 1 wherein the inner housing includes telescoping portions movable to change a dimension of the first peripheral wind inlet.

10. An omnidirectional wind collection apparatus according to claim 2 further comprising a base section of the wind pass-through portion, the base section including a region for mounting the electric generator.

11. An omnidirectional wind collection apparatus comprising:
    a peripheral wind inlet at least partially circumferentially formed in an outer housing to omnidirectionally collect wind;
    an inner housing at least partially disposed within the outer housing, the inner housing having a concentric inner passage to guide the wind collected from the peripheral wind inlet, the inner passage being configured as a Venturi tube from an inlet portion to an outlet portion;
    a Bernoulli effect wind pass-through portion formed above the Venturi tube, the wind flow in the wind pass-through portion being uncollected and being substantially perpendicular to the flow of wind in the Venturi tube to create a low pressure region to facilitate passage of the collected wind through the Venturi tube.

12. An omnidirectional wind collection apparatus according to claim 11 further comprising an electric generator having rotatable blades configured to rotate in a horizontal plane mounted above the Venturi tube and using the collected wind from the Venturi tube to drive the rotatable blades to generate electricity.

13. An omnidirectional wind collection apparatus according to claim 11 wherein the outer housing is adjustable relative to the inner housing such that the peripheral wind inlet can be open or closed depending upon the position of the outer housing.

14. An omnidirectional wind collection apparatus according to claim 11 wherein the Bernoulli effect wind pass-through portion includes an external flange and the outer housing includes a mating flange adjacent the peripheral wind inlet such that the external flange and the mating flange contact each other when the first peripheral wind inlet is closed.

15. An omnidirectional wind collection apparatus according to claim 11 further comprising a filter positioned in the Venturi tube.

16. An omnidirectional wind collection apparatus according to claim 11 further comprising a channel between the inner and outer housing for collection of particulate matters.

17. An omnidirectional wind collection apparatus according to claim 11 wherein the outer housing and the inner housing each have a substantially circular cross-section.

18. An omnidirectional wind collection apparatus according to claim 11 further comprising movable flaps circumferentially connected to the outer housing and configured to open and close the peripheral wind inlet.

19. An omnidirectional wind collection apparatus according to claim 1 wherein the inner housing includes telescoping portions movable to change a dimension of the peripheral wind inlet.

20. A wind collection apparatus comprising:
a wind inlet formed in an outer housing to collect wind;
an inner housing at least partially disposed within the outer housing, the inner housing having a concentric inner passage with an opening at a base end thereof to guide the wind collected from the wind inlet and an opening at a top end thereof through which the collected wind exits the inner passage;
the outer housing, the inner housing, the wind inlet and the base end opening of the concentric inner passage being configured such that the wind collected from the wind inlet changes direction between the air inlet and the base end opening of the inner passage such that debris carried by the collected wind are separated from the collected wind in the region in which the collected wind changes direction.

* * * * *